United States Patent [19]

El-Shoubary et al.

[11] Patent Number: 6,096,223
[45] Date of Patent: Aug. 1, 2000

[54] METHOD FOR TREATING METAL CONTAMINATED WATER

[75] Inventors: Youssef El-Shoubary, North Brunswick; Subash C. Seth, Watchung; Ned A. Speizer, Brick, all of N.J.

[73] Assignee: Merck & Co., Inc., Rahway, N.J.

[21] Appl. No.: 09/166,664

[22] Filed: Oct. 5, 1998

[51] Int. Cl.$^7$ .................................. C02F 1/62; C02F 1/70
[52] U.S. Cl. .......................... 210/720; 210/724; 210/726; 210/757; 210/913
[58] Field of Search ..................................... 210/720, 724, 210/726, 757, 912, 913

[56] References Cited

U.S. PATENT DOCUMENTS

| | | |
|---|---|---|
| 4,671,882 | 6/1987 | Douglas et al. ...................... 210/720 |
| 5,158,687 | 10/1992 | Terry et al. ............................ 210/720 |
| 5,211,853 | 5/1993 | Jackson et al. ........................ 210/713 |

OTHER PUBLICATIONS

Presentation at American Inst. of Chem. Engineers, 1998 Spring Mtg., New Orleans, LA, by S. Seth, et al.

Environmental Progress vol. 17, No. 3 (1998), pp. 209–213, by Y. El–Shoubary, et al.

Primary Examiner—David A. Simmons
Assistant Examiner—Betsey J. Morrison
Attorney, Agent, or Firm—Elliott Korsen; Mark R. Daniel

[57] ABSTRACT

The present invention relates to a process for treating contaminated water to precipitate metals without increasing the total dissolved solids content. In particular, the invention relates to the use of phosphoric acid and calcium hydroxide or calcium oxide to adjust the pH of chromium contaminated groundwater during the treatment process without increasing the total dissolved solids (TDS).

22 Claims, 3 Drawing Sheets

METHOD FOR TREATING METAL CONTAMINATED WATER

BACKGROUND OF THE INVENTION

The invention relates to a process for treating contaminated water to precipitate metals without increasing the total dissolved solids content. In particular, the invention relates to a process for cleaning water contaminated with hexavalent chrome.

To clean water contaminated with hexavalent chrome, the chrome must be reduced to it's trivalent state prior to precipitation. Hexavalent chrome reduction typically occurs at pH around 3 using an acid, such as sulfuric acid, and a reducing agent (such as sulfur dioxide, ferrous sulfate, sodium metabisulfite, sodium bisulfite, electrolyte iron). The reduction step is followed by a neutralization step which consists of adjusting the pH of the acidic contaminated water to a higher pH to precipitate the trivalent chrome and to meet the discharge permit conditions. The required pH for the chrome precipitation is between 6.5 and 8.2. The most common alkaline reagent for raising the pH is sodium hydroxide. This is due to it's high and immediate solubility in water. These two characteristics result in a reduction in the plant equipment sizes since little residence time is required to achieve the required pH. However, the same two characteristics cause the total dissolved solids (TDS) of the treated water to dramatically increase. The high TDS in the treated water is a problem since there are typically limits on the amount of permitted discharge. To reduce the TDS in the treated water stream, ultrafiltration, microfiltration, and reverse osmosis are used. These processes result in the concentration of the salt (TDS) in a small percentage of the treated stream (around 10%) and produce a filtrate with acceptable levels. The concentrated reject stream remains a problem. Crystallizers or evaporators are also used to further reduce the reject stream volume. The evaporation and filtration units are very expensive, hard to operate, require large space areas for installation, and have a high energy requirement for operation. To eliminate these expensive unit operations, a chemical process which will not cause an increase in the TDS of the treated stream and produce chromium free water is needed.

Thus, there exists a need for a safe, environmentally sound process for the cleaning of metal contaminated water without raising the TDS in the treated water.

SUMMARY OF THE INVENTION

The present invention relates to a process for treating contaminated water to precipitate metals resulting in no increase in the total dissolved solids. The metals should be in a valent state that require reduction or oxidation to achieve the insoluble state. The insoluble state can be achieved by mixing the contaminated water with an electron donor or receiver to alter the metal from its soluble valent state into its insoluble valent state. These metals include chromium (VI & III), arsenic (V & III), phosphorous (V & III), silicon (IV & VI), manganese IV & VII, copper (II & I), cobalt (III &II) and nickel (II & III). For example, chromium VI is very soluble in water and needs to be reduced in order to be transformed to chromium III which is insoluble in water. The reduction occurs at low pH (below 7) and the precipitation of chrome III occurs at high pH (above 7). This invention relates to a process for cleaning the contaminated water without increasing the total dissolved solids (TDS) that usually occur due to the chemical addition to adjust the pH. In particular, the invention relates to the use of phosphoric acid and calcium hydroxide to adjust the pH of chromium contaminated water during the treatment process without increasing the total dissolved solids (TDS).

DETAILED DESCRIPTION OF THE INVENTION

Figure 1:
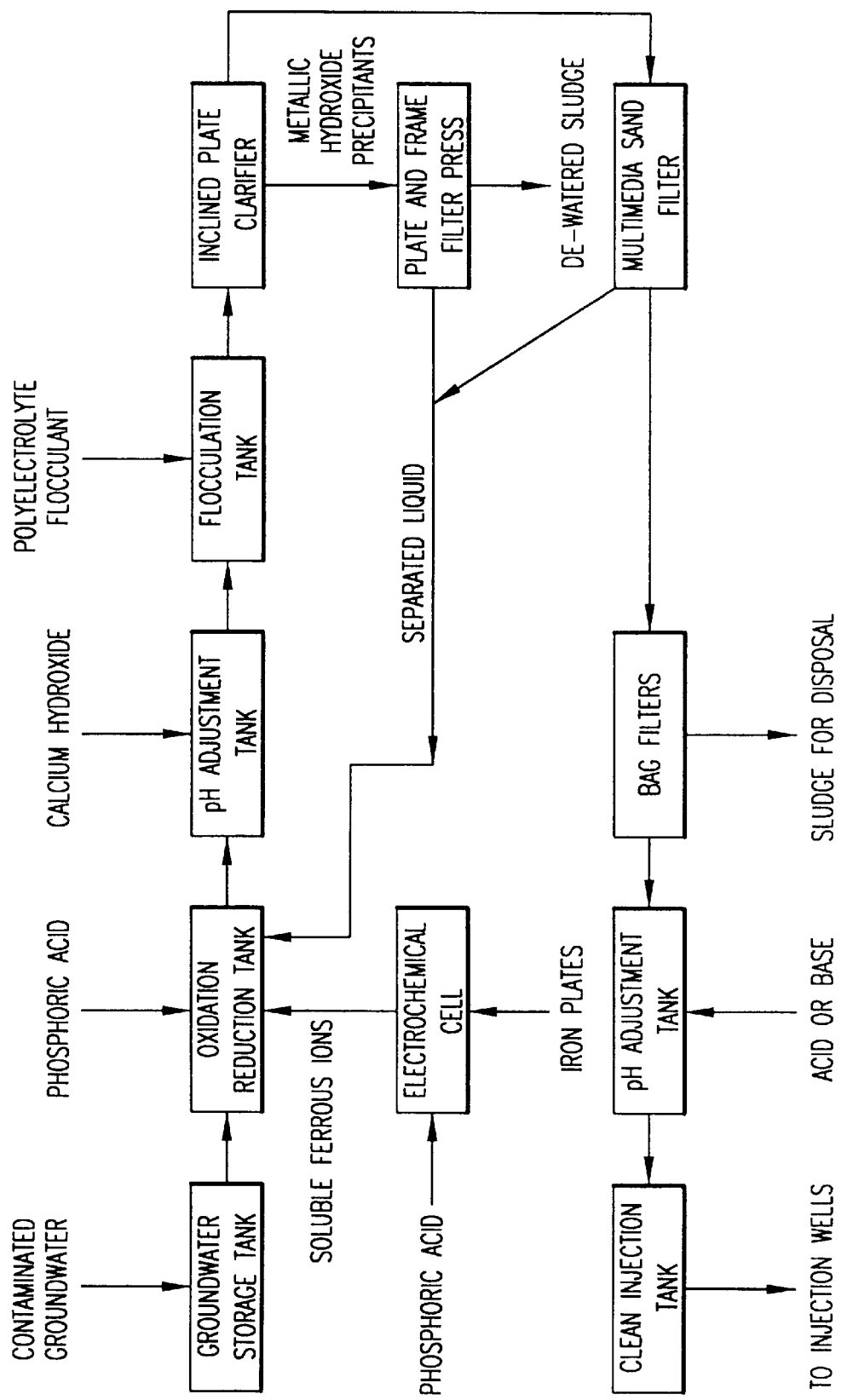
FIG. 1 shows a schematic illustration of one embodiment of the total electrochemical process.

The present invention relates to a process for treating contaminated water to precipitate metals without increasing the total dissolved solids content. In particular, the invention relates to the use of phosphoric acid and calcium hydroxide to adjust the pH of chromium contaminated water during the treatment process without increasing the total dissolved solids (TDS).

The process comprises the steps of:

a. collecting the contaminated water;

b. lowering the pH to below 7 in an on-line acid tank;

c. mixing the contaminated water with an electron donor or electron receiver to switch the contaminant from its soluble valent state into its insoluble valent state;

d. adjusting the pH of the contaminated water to above 7 to allow for precipitation of contaminants and added species; and e. collecting and processing the precipitated sludge.

Further processing of the water then takes place as hereinafter described.

In a preferred embodiment, there is disclosed a process for treating chromium contaminated water comprising the steps of a. collecting the contaminated water;

b. lowering the pH to below 7 in an on-line acid tank;

c. mixing soluble ferrous ions with the contaminated water to reduce the hexavalent chromium to its trivalent state;

d. adjusting the pH to above 7 to allow for precipitation of the contaminant; and e. collecting and processing the precipitated sludge.

It has been found that by using phosphoric acid in place of sulfuric acid, the industry standard, and calcium hydroxide instead of sodium hydroxide, the TDS is significantly lowered.

It has been shown that the use of sodium hydroxide and sulfuric acid results in the formation of sodium sulfate as shown in the following reaction:

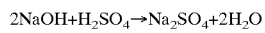

$$2NaOH + H_2SO_4 \rightarrow Na_2SO_4 + 2H_2O$$

Sodium sulfate is very water soluble and consequently causes the TDS to increase. By using calcium hydroxide and phosphoric acid, it results in the formation of calcium phosphates which are not as soluble and do not increase the TDS. This is shown in the following equation:

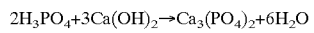

$$2H_3PO_4 + 3Ca(OH)_2 \rightarrow Ca_3(PO_4)_2 + 6H_2O$$

In the treatment of chromium contaminated water, electrochemical treatment is one method of reducing the hexavalent chromium to trivalent chromium. Electrochemical treatment operations consists of reduction of the chromium VI in an acidic pH (about 3.2 when sulfuric acid is used) using an electron donor such as iron, zinc, silver or any other metal that can donate electrons to reduce the hexavalent chromium. In a preferred embodiment, soluble ferrous ions are used in the reduction. The iron is usually produced off-line by an electrochemical cell using sacrificial electrodes and sulfuric acid, as represented by the following equation:

$$Fe^0 \rightarrow Fe^{+2} + 2e^-$$

Using a slight excess of the stoichiometric 3.2 pounds of iron per pound of chromium, the ferrous ions are mixed with the contaminated water. In the resulting redox reaction, hexavalent chromium is reduced to the insoluble trivalent state and divalent iron is oxidized to its insoluble trivalent state at an acidic pH (about 3), as represented by the following equation:

$$3Fe(OH)_2 + CrO_4^{-2} + 4H_2O \rightarrow 3Fe(OH)_3 + Cr(OH)_3 + 2OH^{-1}$$

The slight excess of ferrous ions, adjusted pH and sufficient residence time drive the reaction to completion. After the reaction is completed, the pH is adjusted to a slightly alkaline state (about 8.4) using sodium hydroxide to allow precipitation of the metal ions in a pH adjustment tank. It should be noted here that when sulfuric acid is used, a pH of 3.3 or below must be achieved for the reduction of the chromium VI to occur. When sodium hydroxide is used to elevate the pH, a pH of 8.3 or above must be achieved to precipitate the resultant chromium III. Additionally, an amount greater than the stoichiometric ratio of iron to chromium should be used (3.6 gm of iron/gm of chrome).

After the electrochemical treatment, the stream is advanced to a clarifier where a polyelectrolyte polymer is added to promote coagulation of the reduced metal which settles at the bottom of the clarifier. Solids are drawn from the bottom of the clarifier and allowed to settle in a gravity thickener followed by a plate and frame filter press. The treated water is pH adjusted to below 8 and polished with multimedia filters and carbon, prior to reinjection to the aquifer.

The water is continually checked for total dissolved solids and total chromium concentration. The chrome concentration is continuously kept below 30 PPB; however, the total dissolved solids (TDS) oscillate between 1100 to 1400 PPM, depending on the plant TDS influent concentration which ranges from 400–700 PPM and the chromium influent concentration which ranges between 5,000 PPB and 25,000 PPB.

As noted above, one of the main reasons for the increase in the total dissolved solids is the addition of caustic sodium hydroxide to raise the pH from 3 to 8. The sodium hydroxide is very soluble in water and reacts with the sulfuric acid as shown in the following equation:

$$2NaOH + H_2SO_4 \rightarrow Na_2SO_4 + 2H_2O$$

The sodium sulfate formed is very water soluble and consequently causes the Total Dissolved Solids to increase from about 500 to 1150 PPM.

It has been found that by replacing the sulfuric acid with phosphoric acid and the sodium hydroxide with calcium hydroxide, the resultant chemistry is $$2H_3PO_4 + 3Ca(OH)_2 \rightarrow Ca_3(PO_4)_2 + 6H_2O$$

Calcium phosphates are not soluble in water and consequently the total dissolved solids will not increase. It should be noted here that when phosphoric acid is used to lower the pH, the reduction of chromium VI did not depend on the acidic pH of the solution. The reduction reaction of chromium occurred even at pH of about 6. When calcium hydroxide was used to lower the pH, the precipitation of chromium III did not depend on the alkalinity of the solution. Even at pH 7.5, the precipitation occurred. In addition, the reduction reaction of chromium VI occurred even when below stoichiometric ratios of iron was used (about 1.6 gm of iron/gm of chrome). This may be due to the formation of chromium phosphates which are insoluble in water.

In the process of the invention, any type of phosphoric acid such as pyrophosphoric acid, metaphosphoric acid, polyphosphoric acid, superphosphoric acid or nonorthophosphoric acid may be used. Phosphoric acid of any purity, food grade, industrial grade, fertilizer grade or unrefined green grade is acceptable. In the process, the phosphoric acid has a $P_2O_5$ concentration between about 1% to about 80%, preferably about 20% to about 45%.

The calcium hydroxide used in step d to raise the pH from about 3 to about 8 can be added in slurry form or solid form. Alternatively, calcium oxide can be used because it converts to calcium hydroxide upon contact with the water. Lime and hydrated lime can be used as the form of the calcium oxide and hydroxide. It is used in the mixed slurry at a concentration of between about 1% to about 50%, preferably about 18% to about 25%.

FIG. 1 illustrates a general schematic flow diagram of the entire process including the processing of the precipitated sludge.

The following examples illustrate, without limiting, the scope and spirit of the invention.

EXAMPLE 1

Experiments were performed to confirm that the calcium/phosphoric system will not effect the TDS of the treated water. About 300 cc of groundwater, contaminated with 3.9 ppm of chrome(VI), containing 554 ppm of TDS, was used for each experiment. The iron solution was produced by soaking iron sheets with sulfuric acid in an electric cell. This resulted in a solution which contained 1.7% iron (by weight). The use of sulfuric acid instead of phosphoric acid will cause the TDS values to be slightly higher due to the formation of some sulfate products which are water soluble. The amount of electrolyte iron used in each experiment was varied between no iron to about 13 gm iron/gm of chrome (stoichiometric ratio=3.2 gm iron/gm chrome). The volume of the sulfuric acid solution ranged between 0.1 to 0.65 cc per experiment. The pH of the solution was lowered to 3.2 using phosphoric acid. The solution was stirred for 5 minutes, then the pH of the mixture was raised to 7.7 using calcium hydroxide. A white precipitant was seen in all cases. The white precipitant was filtered out of solution using 20 micron filter paper. The filtered groundwater was analyzed for total chrome using EPA test method 6010 (EPA 200.7), total dissolved solids using EPA test method 160.1 and total suspended solids using EPA test method 160. Total suspended solids was not detected in all treated groundwater streams, however, TDS increased with the increase in the iron/sulfuric acid addition. This indicates that the use of phosphoric acid instead of sulfuric acid to generate the electrolyte iron solution could produce treated groundwater with lower TDS. The chrome analysis of the treated groundwater showed the total chrome concentration to be below 50 ppb at all times except when no iron was used.

EXAMPLE 2

Figure 2:
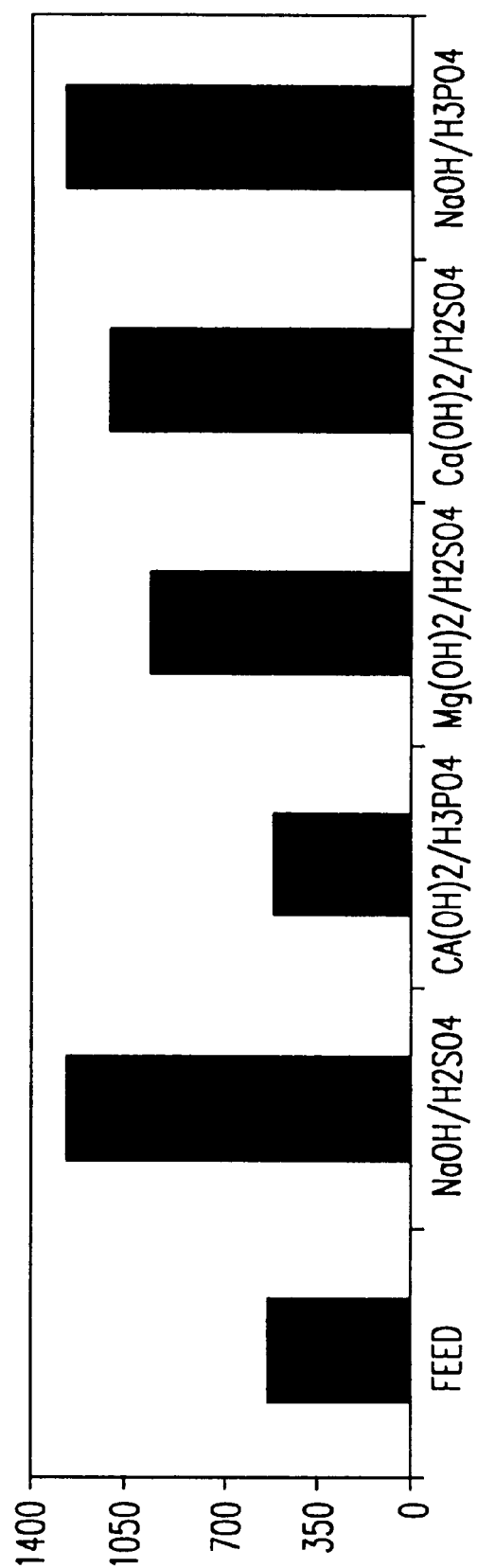
FIG. 2 shows results of comparing different acids and bases in the generation of TDS in the treated groundwater.

Experiments were performed to compare the calcium/phosphoric system to sodium/phosphoric, magnesium/ sulfuric, calcium/sulfuric and sodium/sulfuric systems and the effects of the different systems on the amount of TDS in the treated groundwater. Each experiment was performed using chromium contaminated groundwater (3.4 PPM). Electrolyte iron in sulfuric acid was added to each sample at 3.5 gm iron/gm chrome. The pH of the water was lowered using sulfuric acid to a pH of 3.2. After stirring for 5 minutes at the acidic pH, the pH of the solution was raised to 8 using the different salts (magnesium hydroxide, sodium hydroxide and calcium hydroxide). The solution was then filtered to separate the precipitant, and the clear liquid was analyzed for chromium and TDS using the methods mentioned above. It was found that the use of calcium hydroxide with phosphoric acid generated no additional total dissolved solids. The contaminated water and the treated water contained the same amount of total dissolved solids (554 ppm) since calcium phosphate is not soluble in water. The chromium analysis showed the water has a chromium concentration below 20 ppb in all cases. FIG. 2 summarizes the results.

EXAMPLE 3

Figure 3:
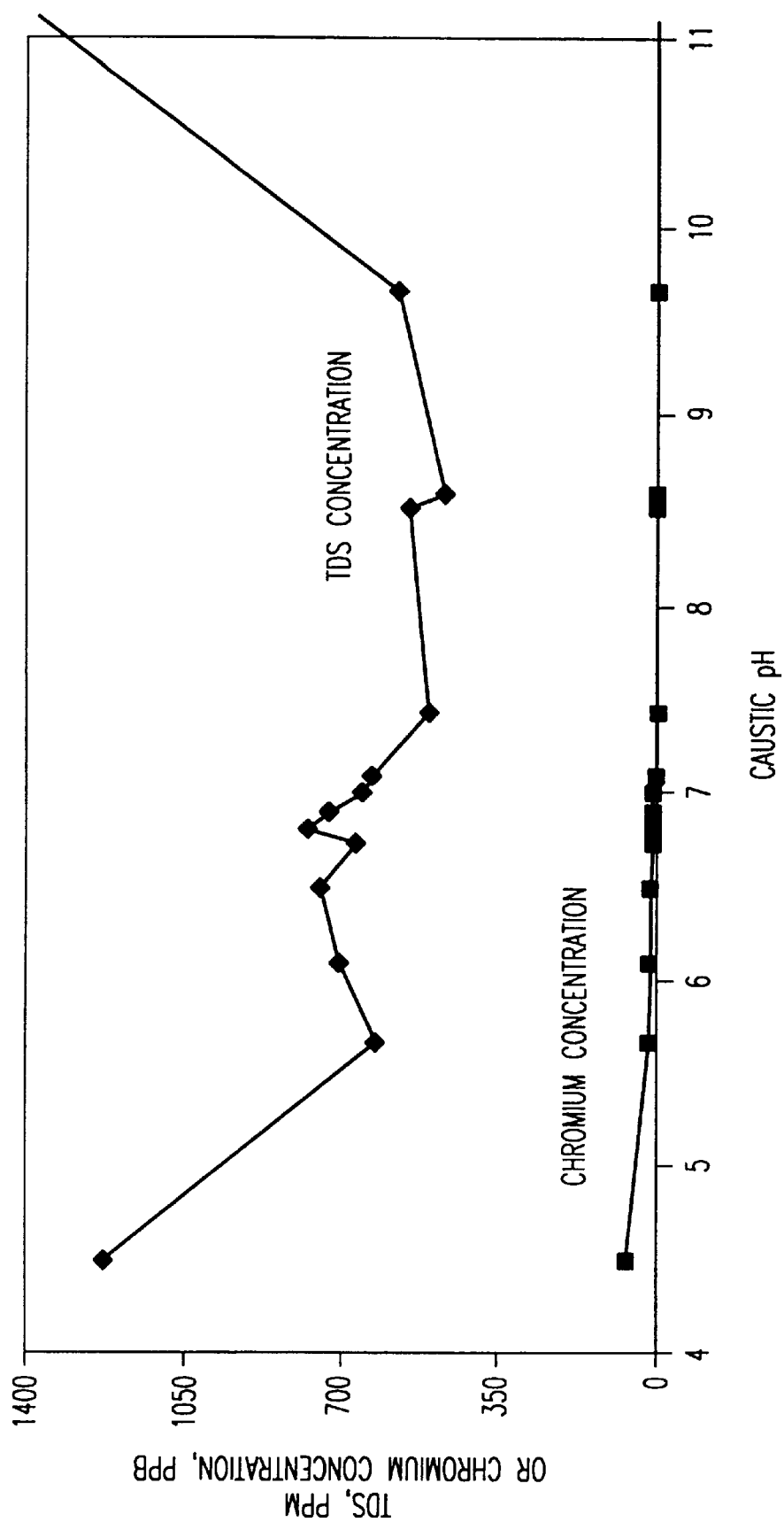
FIG. 3 shows the effect of pH on TDS using the calcium/phosphorus system.

Experiments were performed using 300 cc of water contaminated with 3.4 ppm of hexavalent chrome. The water was mixed with 1.7% iron in sulfuric acid solution to maintain an iron chrome ratio of 3.5 gm iron/gm chrome. The pH of the solution was lowered to 3.2 using phosphoric acid. The solution was stirred for 5 minutes and the pH of the solution was raised to between 4.5 and 12 using calcium hydroxide. The white precipitant formed was filtered out of solution using 20 micron filter paper. The filtered liquid was collected, analyzed for TDS and for total chrome concentration using the EPA methods mentioned above. FIG. 3 summarizes the results. The chrome precipitation starts at pH of 5.6 and maximum precipitation occurred at pH around 7.4.

The treated groundwater contained between 23 to 45 ppb of chrome at pH of 6 and the chrome was not detected at any pH above 7. TDS values in the treated groundwater stream depended on the pH values of the precipitation. TDS ranged from 600 to 800 at pH below 7 and reached an absolute minimum at pH between 7 and 8. It was found that the TDS of the treated groundwater could even be lower than the starting TDS of the feed water. This is due to the fact that the ground-water contains naturally occurring calcium. This calcium reacts with the phosphoric acid and drops out of solution causing lower TDS. The TDS of the treated ground water was reduced from 554 ppm to 448 when the precipitation pH was 7.44.

EXAMPLE 4

Bench Optimization Work

The bench scale work to achieve optimum plant operation is summarized.

Generation of Electrolyte Iron Using Phosphoric Acid:

Two iron electrodes were placed in about 400 cc of phosphoric acid (pH=3.0) for 3.5 hours. Electrical current was supplied to the electrode at 20 volts and 10 amperes. The iron started to dissolve immediately in the acid and an iron concentration of 0.4% was measured in the solution after 3.5 hours.

Feed:

The feed for these experiments was groundwater contaminated with 2.3 PPM of hexavalent chrome. The TDS of the feed was about 564 and the total orthophosphates content was measured to be 0.778 PPM.

Generation of Calcium Hydroxide Slurry:

About 750 cc of water was mixed with 130 gm of calcium in a beaker. The solution was thoroughly mixed using a magnetic stirrer for about 30 minutes prior to use. This is shown in the following reaction:

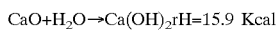

$$CaO+H_2O \rightarrow Ca(OH)_2 \, rH=15.9 \text{ Kcal}$$

The produced calcium hydroxide slurry was added whenever caustic pH was needed.

Optimization for the Iron Amount:

Experiments were performed to find the optimum amount of iron needed to reduce the chrome (VI) to chrome (III). About 700 cc of groundwater contaminated with 2.3 PPM of chrome (VI), was used for each experiment. The iron solution was produced by soaking iron sheets with phosphoric acid in an electric cell. A solution was produced containing 0.4% iron (by weight). The amount of iron used was based on the ratio between the iron in the phosphoric acid solution and the chrome (VI) in the contaminated groundwater. This ratio was varied between 0.61 gm iron/gm chrome to about 2.2 gm iron/gm of chrome. Following the iron addition, the pH of the solution was lowered to around 4 using phosphoric acid. The solution was stirred for 3 minutes, then the pH of the mixture was raised to around 8 using the calcium hydroxide solution (17% by weight). A white precipitant was seen in all cases. The white precipitant was filtered out of solution using 20 micron filter paper. The filtered groundwater was analyzed for total chrome using EPA test method 6010 (EPA 200.7) and total dissolved solids (TDS) using EPA test method 160. Table 1 summarizes the generated data.

TABLE 1

Summary of The Experiments
Performed For Iron/Chrome Optimization

| gm iron/gm chrome | Chromium Conc. (ppb) | Total Dissolved Solids (ppm) |
| --- | --- | --- |
| 0.61 | 59 | 440 |
| 0.9 | 55 | 414 |
| 1.21 | 13 | 450 |
| 1.5 | 9 | 484 |
| 1.8 | 15 | 484 |
| 2.12 | 20 | 500 |

As shown above, the optimal chromium reduction condition was achieved at about 1.2 gm iron/gm chromium. Accordingly, a value above 1.2 gm iron/gm chromium was used for all optimization experiments.

Optimization for the acidic pH Value:

To find the optimum acidic pH value for the reduction of the hexavalent chrome, a beaker test was performed. The test consisted of one set of experiments where the pH was adjusted between 2.3 and 6.9. Each experiment was performed using 700 cc of groundwater contaminated with 2.6 PPM hexavalent chrome. Electrolyte iron (0.4% iron in phosphoric acid) was added to achieve a ratio of 1.6 gm iron/gm chrome. The pH of the solution was lowered to the target pH using phosphoric acid. After allowing 3 minutes of residence time with agitation, the pH of the solution in all experiments, was raised to around 8.4. The white precipitant was filtered using 20 micron filter paper. The treated water was analyzed for total chromium using EPA test method 6010 (EPA 200.7), total dissolved solids using EPA test method 160.1 and total suspended solids using EPA test method 160. The data is summarized in table 2. It was found that the chrome concentration did not depend on the acidic pH. The chrome concentration was below the target concentration of 50 ppb regardless of the starting pH. The total suspended solids was always below 10 PPM and TDS were below 550 independent of the starting pH.

TABLE 2

Summary of Experiments Performed
to Determine Best Acidic Conditions

| Acidic pH | Caustic pH | Chromium Conc. (ppb) | TDS (PPM) |
|---|---|---|---|
| 2.3 | 8.65 | 2.5 | 318 |
| 2.74 | 8.45 | 14 | 445 |
| 2.8 | 8.5 | 4 | 379 |
| 3 | 8.45 | 2 | 455 |
| 3.15 | 7.8 | 0 | 456 |
| 3.18 | 8.25 | 16 | 454 |
| 3.25 | 8.45 | 2 | 515 |
| 3.51 | 8 | 17 | 513 |
| 3.62 | 8.45 | 5 | 503 |
| 3.71 | 8.5 | 6 | 467 |
| 3.81 | 8.45 | 18 | 505 |
| 4 | 8.5 | 19 | 472 |
| 4.38 | 8.5 | 19 | 459 |
| 4.8 | 8.45 | 15 | 492 |
| 5.96 | 8.5 | 6 | 472 |
| 6.4 | 8.5 | 30 | 482 |
| 6.9 | 8.5 | 7 | 458 |

Effect of Caustic pH on the Chrome Recovery and TDS:

Experiments were performed using 800 cc of water contaminated with 2.3 PPM of hexavalent chrome. The water was mixed with the 0.4% iron/phosphoric acid solution to maintain an iron chrome ratio of 1.65 gm iron/gm chrome. The pH of the solution was lowered to 3.3 using phosphoric acid. The solution was stirred for 3 minutes and the pH of the solution was raised to between 7.2 and 12 using calcium hydroxide. The white precipitate formed was filtered out of solution using 20 micron filter paper. The filtered liquid was collected, analyzed for TDS and total chrome concentration using the same EPA methods mentioned above. Table 3 represents the generated data. It was found that the chrome precipitation does not depend on the caustic pH. However, the TDS of the solution was effected by the caustic pH. As the pH was raised from 7 to about 9, the TDS is reduced and then starts to increase with increasing pH.

TABLE 3

Effect of Caustic pH on TDS and Chrome Concentration

| Acidic pH | Caustic pH | Chromium Conc. (ppb) | TDS Conc. (PPM) |
|---|---|---|---|
| 3.3 | 7.2 | 13 | 598 |
| 3.3 | 7.45 | 9 | 588 |
| 3.3 | 7.53 | 0 | 553 |
| 3.3 | 7.7 | 6 | 555 |
| 3.15 | 7.78 | 0 | 456 |
| 3.25 | 7.88 | 2 | 583 |
| 3 | 7.88 | 9 | 478 |
| 3.51 | 7.91 | 17 | 513 |
| 3.31 | 7.98 | 12 | 532 |
| 3.18 | 8.15 | 16 | 454 |
| 3.38 | 8.37 | 6 | 500 |
| 3.25 | 8.45 | 21 | 515 |
| 3.18 | 8.54 | 14 | 409 |
| 3.71 | 8.63 | 11 | 467 |
| 3.32 | 10.5 | 20 | 718 |
| 3.41 | 11 | 11 | 638 |
| 3.38 | 11.85 | 7 | 472 |

Further experiments were performed to compare the calcium/phosphoric system to the sodium/sulfuric, magnesium/sulfuric, calcium/sulfuric and sodium/phosphoric systems. These experiments were performed to investigate the effects of the different systems on the amount of TDS in the treated groundwater. Each experiment was performed using chromium contaminated ground-water (3.4 PPM). Electrolyte iron in sulfuric acid was added to each sample at 3.5 gm iron/gm chrome. The pH of the water was lowered using sulfuric acid or phosphoric acid to a pH of 3.2. After stirring for 5 minutes at the acidic pH, the pH of the solution was raised to 8 using the different salts (magnesium hydroxide, sodium hydroxide and calcium hydroxide). The solution was then filtered to separate the precipitant, and the clear liquid was analyzed for chromium and TDS using the methods noted above. As shown in FIG. 4, the use of calcium hydroxide with phosphoric acid generated no additional total dissolved solids. The contaminated water and the treated water contained the same amount of total dissolved solids (554 ppm). This can be explained since the calcium phosphate is insoluble in water. The chromium analysis showed the treated water with chromium concentration below 20 ppb in all cases.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall with the spirit and scope of the present invention as defined in the following claims are expressly intended to be embraced thereby.

What is claimed is:

1. A process for treating contaminated water to precipitate metals comprising
   a. collecting the contaminated water;
   b. lowering the pH to below 7 by adding phosphoric acid in an on-line acid tank;
   c. mixing the contaminated water with an electron donor or electron receiver to switch the contaminant from its soluble valent state into its insoluble valent state;
   d. adjusting the pH of the contaminated water to above 7 by adding calcium hydroxide or calcium oxide to allow for precipitation of contaminants and added species; and
   e. collecting and processing the precipitated sludge; wherein the pH of the contaminated water is adjusted during the treatment process without increasing the amount of total dissolved solids.

2. The process of claim 1 wherein phosphoric acid of any purity, food grade, industrial grade, fertilizer grade or unrefined green grade is used.

3. The process of claim 2 wherein the phosphoric acid has a $P_2O_5$ concentration between about 1% to about 80%.

4. The process of claim 3 wherein the phosphoric acid has a $P_2O_5$ concentration between about 20% to about 45%.

5. The process of claim 1 wherein the phosphoric acid used to lower the pH in step b is pyrophosphoric acid, metaphosphoric acid, polyphosphoric acid, superphosphoric acid or nonorthophosphoric acid.

6. The process of claim 1 wherein calcium hydroxide or calcium oxide is used in step d to raise the pH from about 3 to about 8.

7. The process of claim 6 wherein calcium hydroxide is added in slurry form or solid form.

8. The process of claim 6 wherein calcium oxide is added in solid form or slurry form.

9. The process of claim 8 wherein calcium oxide or calcium hydroxide is of any purity or grade.

10. The process of claim 6 wherein the concentration of calcium hydroxide or calcium oxide in the mixed slurry is between about 1% to about 50%.

11. The process of claim 10 wherein the concentration of calcium hydroxide or calcium oxide in the mixed slurry is between about 18% to about 25%.

12. The process of claim 1 wherein the electron donor or receiver used is iron, zinc, silver, aluminum or any other metal that can donate or receive electrons to alter the contaminating metal from its soluble valent state to its insoluble valent state.

13. The process of claim 12 wherein soluble ferrous ions are used to alter the valent state of the contaminating metal.

14. A process for treating chromium contaminated water comprising
   a. collecting the contaminated water;
   b. lowering the pH to below 7 by adding phosphoric acid in an on-line acid tank;
   c. mixing soluble ferrous ions with the contaminated water to reduce the hexavalent chromium to its trivalent state;
   d. adjusting the pH to above 7 by adding calcium hydroxide or calcium oxide to allow for precipitation of the contaminant; and
   e. collecting and processing the precipitated sludge; wherein the pH of the contaminated water is adjusted during the treatment process without increasing the amount of total dissolved solids.

15. The process of claim 14 wherein phosphoric acid of any purity, food grade, industrial grade, fertilizer grade or unrefined green grade is used.

16. The process of claim 14 wherein the phosphoric acid has a $P_2O_5$ concentration between about 1% to about 80%.

17. The process of claim 16 wherein the phosphoric acid has a $P_2O_5$ concentration between about 20% to about 45%.

18. The process of claim 14 wherein the phosphoric acid used to lower the pH in step b is pyrophosphoric acid, metaphosphoric acid, polyphosphoric acid, superphosphoric acid or nonorthophosphoric acid.

19. The process of claim 14 wherein the calcium hydroxide is added in slurry form or solid form.

20. The process of claim 14 wherein calcium oxide or calcium hydroxide is of any purity or grade.

21. The process of claim 14 wherein the concentration of calcium hydroxide or calcium oxide in the mixed slurry is between about 1% to about 50%.

22. The process of claim 21 wherein the concentration of calcium hydroxide or calcium oxide in the mixed slurry is between about 18% to about 25%.

* * * * *

Disclaimer and Dedication 6,096,223 — Youssef El-Shoubary, North Brunswick; Subash C. Seth, Watchung; Ned A. Speizer, Brick, all of N.J. METHOD FOR TREATING METAL CONTAMINATED WATER. Patent dated Aug. 1, 2000. Disclaimer filed Oct. 15, 2002, by the assignee Merck & Co., Inc.

Hereby disclaims all claims and dedicates to the Public the remaining term of said patent.
*(Official Gazette, March 4, 2003*